United States Patent
Park et al.

(10) Patent No.: US 8,896,800 B2
(45) Date of Patent: Nov. 25, 2014

(54) LIQUID CRYSTAL PANEL AND LIQUID CRYSTAL DISPLAY DEVICE USING THE SAME

(71) Applicant: LG Display Co., Ltd., Seoul (KR)

(72) Inventors: JinSeob Park, Gyeongsangbuk-do (KR); JongSub Park, Gyeongsangbuk-do (KR); Hyunwoo Lee, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 179 days.

(21) Appl. No.: 13/707,946

(22) Filed: Dec. 7, 2012

(65) Prior Publication Data
US 2014/0063406 A1    Mar. 6, 2014

(30) Foreign Application Priority Data
Sep. 3, 2012 (KR) .................. 10-2012-0097196

(51) Int. Cl.
*G02F 1/1339* (2006.01)
*G02F 1/1343* (2006.01)
*G02F 1/13* (2006.01)

(52) U.S. Cl.
CPC .................... *G02F 1/1313* (2013.01)
USPC ............... 349/153; 349/139; 349/154

(58) Field of Classification Search
CPC .................. G02F 1/1339; G02F 1/136286
USPC .......................... 349/139, 153–154
See application file for complete search history.

(56) References Cited

U.S. PATENT DOCUMENTS

| 2011/0194062 A1* | 8/2011 | Lee | 349/149 |
| 2011/0211151 A1* | 9/2011 | Jeong | 349/153 |
| 2012/0206669 A1* | 8/2012 | Kim et al. | 349/58 |

* cited by examiner

*Primary Examiner* — Nathanael R Briggs
(74) *Attorney, Agent, or Firm* — Fenwick & West LLP (57) ABSTRACT

A liquid crystal panel and a liquid crystal display device using the same are disclosed, in which among common lines formed to overlap a seal formed between a non-display area and a display area, a common line formed between a light-transmitting portion where a through hole is formed and the display area is formed in a plate structure. The liquid crystal panel comprises a first common line formed between a light-transmitting portion of a non-display area of a driving device array substrate and a display area of the driving device array substrate, a second common line formed between a first non-display area of the non-display area and the display area, a seal formed on the second common line to overlap the second common line without overlapping the first common line, and a liquid crystal injected into the display area and the light-transmitting portion.

10 Claims, 8 Drawing Sheets

FIG. 1

[ Related Art ]

LIQUID CRYSTAL PANEL AND LIQUID CRYSTAL DISPLAY DEVICE USING THE SAME

CROSS REFERENCE TO RELATED APPLICATIONS

This application claims the benefit of the Korean Patent Application No. 10-2012-0097196 filed on Sep. 3, 2012, which is hereby incorporated by reference for all purposes as if fully set forth herein.

BACKGROUND OF THE INVENTION

1. Field of the Invention

The present invention relates to a liquid crystal display device, and more particularly, to a liquid crystal display device having a camera therein.

2. Discussion of the Related Art

Recently, various flat panel display devices have been developed. Examples of the display devices, which have been actively studied, include a liquid crystal display device, a plasma display panel, a field emission display device, and a light emitting display device.

Of the flat panel display devices, the liquid crystal display (LCD) device is a device that displays images using optical anisotropy of a liquid crystal, and is widely used owing to its advantages of thin type, small size, low power consumption, and high picture quality.

Figure 1:
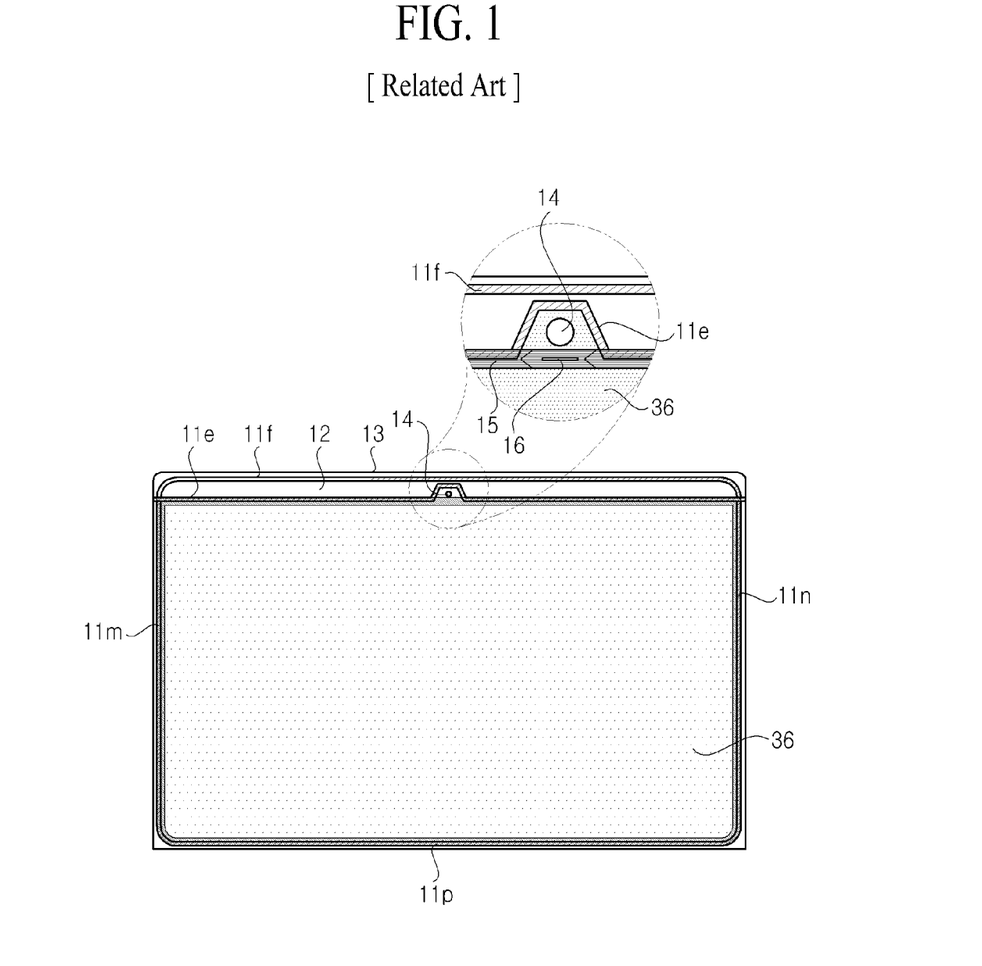
FIG. 1 is a plane view illustrating a liquid crystal display device according to the related art.

FIG. 1 is a plane view illustrating a liquid crystal display device according to the related art, and illustrates that an upper substrate and a lower substrate are bonded to each other by a seal.

According to the liquid crystal display device, the upper substrate and the lower substrate are bonded to each other in a state that a liquid crystal is filled between the upper substrate and the lower substrate. A liquid crystal layer between the upper substrate and the lower substrate is sealed by seals 11e, 11m, 11n and 11p formed outside the liquid crystal panel.

The liquid crystal display device may be divided into a display area where various elements are formed to display images, and a non-display area formed outside the display area. In this case, the seals 11e, 11p, 11m and 11n may be divided into the first seal 11e formed between the first non-display area having a camera therein and the display area, and the second to fifth seals 11f, 11m, 11n, and 11p formed outside the liquid crystal display device at the non-display area of the liquid crystal display device in rectangular shapes, sealing the upper substrate and the lower substrate.

At the lower substrate of the liquid crystal display device, pixels are formed in each area where a gate line crosses a data line. A liquid crystal injected into the pixel is driven by a voltage applied to a common electrode and a pixel electrode formed at the pixel, so as to vary transmittance of light.

The common electrode may be formed in the display area of the upper substrate or the lower substrate. In order to apply a common voltage to the common electrode, a common line 15 connected with the common electrode is formed in the non-display area of the lower substrate or the upper substrate.

With the recent trend of reducing an edge width of the liquid crystal display device, the common line 15 is formed in the upper substrate to overlap with the seals 11e, 11m, 11n and 11p as shown in FIG. 1, wherein the seals are attached onto the common line 15.

When the upper substrate is bonded to the lower substrate by the seals, ultraviolet rays irradiate to the seals from the bottom of the lower substrate, whereby the seals are hardened.

At this time, since the common line 15 overlapping with the seals is formed of metal, it is difficult to harden the seals formed on the common line using the violet rays.

In order to solve this problem, as shown in an enlarged circle of FIG. 1, the common line 15 is formed in a mesh structure of a plurality of lines. In this case, the violet rays irradiated from the bottom of the lower substrate to the seals may harden the seals by transmitting the lines forming the common electrode.

In case of the liquid crystal display device having a camera for video chatting, video conference, etc., as shown in FIG. 1, the first seal 11e formed between the first non-display area 12 and the display area 36 is extended to the first non-display area 12 to surround a through hole 14 formed in the first non-display area to correspond to the camera.

In other words, in the liquid crystal display device according to the related art, light is refracted at an empty space between the lower substrate and the upper substrate where the through hole 14 is formed, whereby a diffraction pattern is generated in the image taken by the camera. In order to prevent such a diffraction pattern from being generated, a method for injecting a liquid crystal into the periphery of the through hole 14 has been used recently. To this end, the first seal 11e formed between the display area 36 and the first non-display area 12 is formed to surround the through hole 14.

Accordingly, no seal is formed between the periphery of the through hole 14 of the first non-display area 12 and the display area. For this reason, the liquid crystal injected into the display area is also injected into the periphery of the through hole 14.

The liquid crystal display device includes a back light unit to irradiate light to the liquid crystal panel 13. The light emitted to the back light unit is emitted to the outside through the liquid crystal panel 13 formed of the lower substrate and the upper substrate.

In this case, as the light irradiated to the non-display area is shielded by the seal, light leakage to the non-display area may be prevented from occurring.

However, since the seal is not formed between the periphery of the through hole 14 and the display area 36 as described above, light leakage may occur in such a manner that the light that has passed through the common line 15 of the mesh structure is displayed in the first non-display area 12. A light leakage area 16 where the light leakage occurs is formed on the common line 15 of the mesh structure formed between the periphery of the through hole 14 and the display area, as shown in FIG. 1.

SUMMARY OF THE INVENTION

Accordingly, the present invention is directed to a liquid crystal panel and a liquid crystal display device using the same, which substantially obviate one or more problems due to limitations and disadvantages of the related art.

An advantage of the present invention is to provide a liquid crystal panel and a liquid crystal display device using the same, wherein, among common lines formed to overlap a seal formed between a non-display area and a display area, a common line is formed between a light-transmitting portion where a through hole is formed and where the display area is formed in a plate structure.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal panel comprises a first common line formed between a light-transmitting portion of a non-display area of a driving device array substrate and a display area of the driving device array substrate, the light-transmitting portion being formed to correspond to a camera arranged below the driving device array substrate, the first common line including a mesh common line formed of mesh lines and a plate common line formed of a plate; a second common line formed between a first non-display area of the non-display area and the display area, connected with a common electrode formed in a color filter substrate or the driving device array substrate and connected to both ends of the first common line, the first non-display area being provided with the light-transmitting portion; a seal formed on the second common line to overlap the second common line without overlapping the first common line, surrounding the light-transmitting portion and the outside of the display area; and liquid crystal injected into the display area and the light-transmitting portion, which are surrounded by the seal, wherein the driving device array substrate and the color filter substrate are bonded to each other by the seal.

In another aspect of the present invention, a liquid crystal display device comprises a display unit that includes the liquid crystal; and a guide frame for supporting the display unit, wherein the guide frame includes a guide sidewall for guiding the side of the liquid crystal panel and a liquid crystal panel support portion for supporting the liquid crystal panel, a first liquid crystal panel support portion of the liquid crystal panel support portion includes a camera receiving portion to which a camera is fixed, and a black matrix fixed to the first liquid crystal panel support portion of the liquid crystal panel and formed in the light-transmitting portion of the first non-display area is provided with a through hole to allow light to be transmitted towards the camera.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 2:
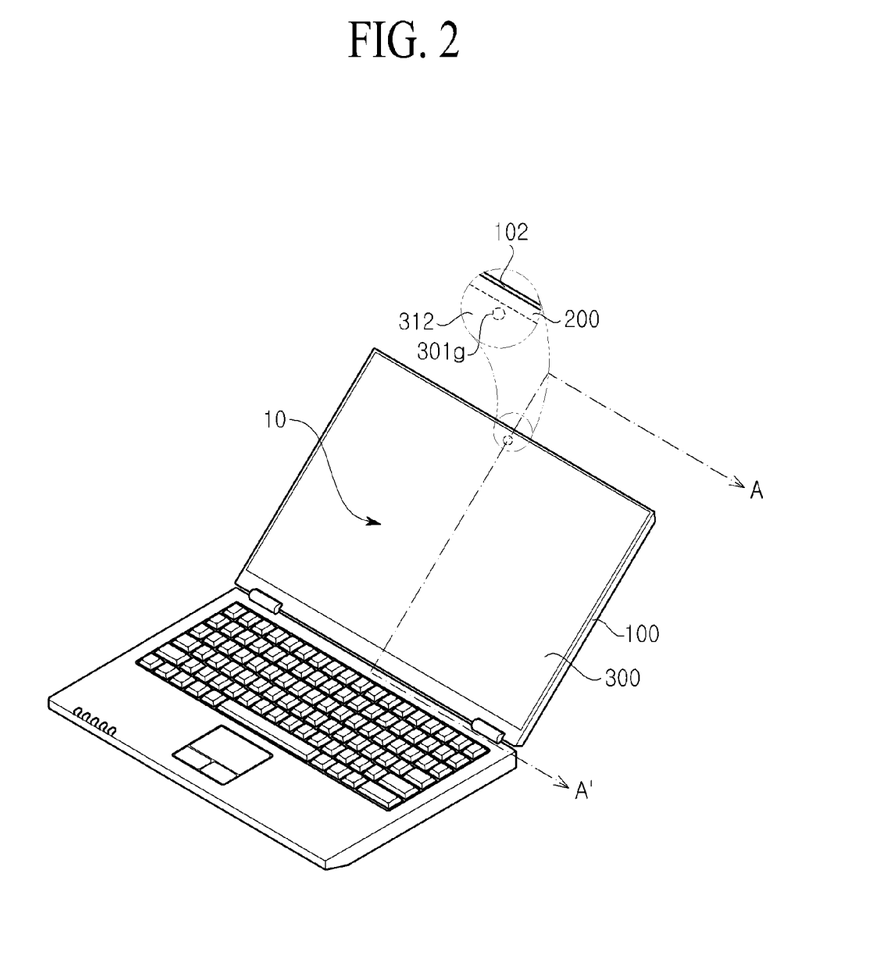
FIG. 2 is an exemplary view illustrating an example of a notebook computer to which a liquid crystal display device according to the present invention is applied.

FIG. 2 is an exemplary view illustrating an example of a notebook computer to which a liquid crystal display device according to the present invention is applied.

The liquid crystal display device 10 according to the present invention is built in a small sized terminal such as a notebook computer, a tablet PC and a cellular phone, and especially has a camera, which can collect images of a user, who uses a small sized terminal, wherein the camera is built below a liquid crystal panel.

Also, the liquid crystal display device 10 according to the present invention has a flat panel without step difference to obtain borderless appearance.

The aforementioned liquid crystal display device 10 according to the present invention may serve as a monitor of a small sized terminal as shown in FIG. 2. Meanwhile, this monitor is configured in such a manner that a set cover 100 surrounds the liquid crystal display device 10, and no step difference is formed in the flat panel of the set cover 100 and the liquid crystal display device 10.

As described above, although the liquid crystal display device 10 according to the present invention may be formed with a flat panel having no step difference, the end of the set cover may surround the outside of the flat panel in a type of a narrow bezel.

In other words, the present invention is intended to allow external light to flow into a camera lens through a through hole 301g formed in a non-display area of the liquid crystal panel. Although the end of the set cover or guide frame, which will be described later, may be configured to partially surround the non-display area of the liquid crystal panel, thereby generating step difference with a flat panel of the liquid crystal panel, the end of the set cover or guide frame and the flat panel of the liquid crystal panel may be configured so as not to generate step difference.

Accordingly, the liquid crystal display device, in which the end of the set cover or guide frame and flat panel of the liquid crystal panel are configured so as not to have step difference, will be described as one example of the present invention. However, the present invention may be applied to the liquid crystal display device having step difference.

Also, in the present invention, the liquid crystal is injected into the through hole 301g corresponding to the camera and the periphery (hereinafter, simply referred to as 'light-transmitting portion') of the through hole. Accordingly, a diffraction pattern generated when the light-transmitting portion is a vacuum state may be avoided. In this case, the light-transmitting portion includes a two-dimensional flat panel, which forms the through hole 301g and the periphery of the through hole on the upper substrate constituting the liquid crystal panel, a three-dimensional space, which includes the two-dimensional flat panel between the upper substrate and the lower substrate, and a two-dimensional flat panel corresponding to the three-dimensional space of the lower substrate.

Figure 3:
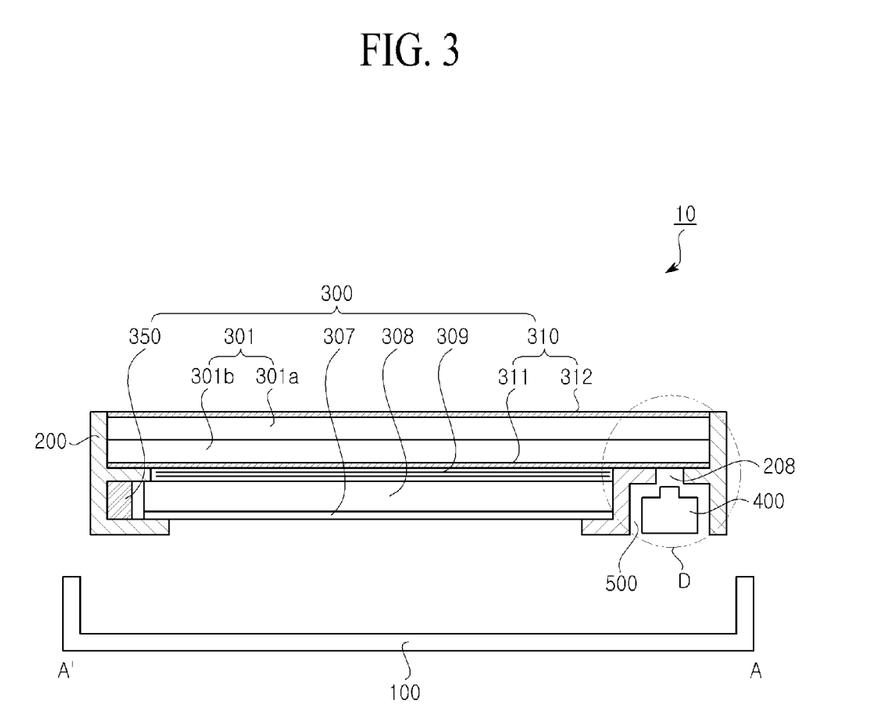
FIG. 3 is a cross-sectional view illustrating a liquid crystal display device according to the present invention.

FIG. 3 is a cross-sectional view illustrating a liquid crystal display device according to the present invention, taken along line A'-A of FIG. 2.

The liquid crystal display device 10 according to the present invention is built in the aforementioned small sized terminal to display images, and includes a guide frame 200 and a display unit 300 as shown in FIG. 3, and is fixed to a set cover 100. Also, a camera 400 is fixed between the set cover 100 and the guide frame 200 or between the guide frame 100 and a liquid crystal panel 301 of the display unit. In other words, the liquid crystal display device 10 according to the present invention may form a monitor of the small sized terminal in a state that it is covered with the set cover 100. Meanwhile, although the liquid crystal display device 10 according to the present invention may include the set cover 100, the liquid crystal display 10, which excludes the set cover, will be described hereinafter as the example of the present invention. In other words, the set cover 100 covers appearance of the liquid crystal display device, and may be regarded as substantially forming the appearance of the small sized terminal such as a notebook computer.

First of all, the set cover 100 is formed in a rectangular frame, and supports the guide frame 200 and covers the liquid crystal display device 10 by surrounding the side of the guide frame 200.

Next, the guide frame 200 serves to support the display unit 300, and is received in a receiving space provided in the set cover 100.

Finally, the display unit 300 may include a liquid crystal panel 301, a polarizing film 310, an optical film portion 309, a light guide plate 308, a reflecting plate 307, and a light source 350.

The liquid crystal panel 301 is configured in such a manner that an upper substrate 301a is bonded to a lower substrate 301b, and is divided into a display area where various elements are formed and a non-display area formed outside the display area. In this case, the non-display area may be divided into a first non-display area, a second non-display area, a third non-display area and a fourth non-display area. The first non-display area is an area where the through hole 301g (FIG. 4) corresponding to a camera and a camera hole 208 are formed, and the second non-display area is an area that faces the first non-display area, and the third non-display area and the fourth non-display area are areas respectively arranged at both sides of the first non-display area and the second non-display area.

The aforementioned liquid crystal panel 301 outputs images depending on transmittance of light emitted from the light source 350 by driving the liquid crystal injected between the upper substrate and the lower substrate using a voltage applied to the lower substrate.

The light source 350 supplies light to the liquid crystal panel 301. Although various types of light sources may be used as the light source, a light emitting diode (LED) may recently be used as the light source.

The light guide plate 308 serves to guide light emitted from the light source 350 towards the liquid crystal panel 301 by diffusing and reflecting the light. In other words, the light guide plate 308, as shown in FIG. 3, is provided in a side light type liquid crystal display device in which the light source 350 is formed at a side, and serves to reflect light emitted from the light source 350 towards the liquid crystal panel 301.

The optical film portion 309 serves to diffuse the light that has passed through the light guide plate 308 or allow the light that has passed through the light guide plate 308 to vertically enter the liquid crystal panel 301. For example, the optical film portion 309 may be a diffuser sheet or a prism sheet.

The reflecting plate 307 is provided on the bottom of the light guide plate 308 and serves to reflect the light emitted from the light source 350 towards the liquid crystal panel 301. In other words, the light emitted from the light source 350 and entering the light guide plate 308 is refracted by a pattern formed at the light guide plate 308 and then reflected towards the liquid crystal panel 301. However, the light may be emitted to the outside through the bottom without being reflected, and in this case, the reflecting plate 307 serves to again reflect the light and guide the reflected light towards the liquid crystal panel 301.

The polarizing film 310 includes an upper polarizing film 312 and a lower polarizing film 311. The polarizing film 310 is attached to the flat panel or the bottom of the liquid crystal panel 301 that includes a liquid crystal, and serves to pass through only light of a desired direction component of the light emitted from the light source.

Although the side light type display unit in which the light source is arranged at the side of the liquid crystal panel has been described as above, the display unit applied to the present invention may be configured in a direct light type in which the light source is arranged below the liquid crystal panel.

The present invention is characterized in the structure of the liquid crystal panel 301 of the display unit. Hereinafter, details of the liquid crystal panel and the liquid crystal display device using the same according to the present invention will be described with reference to FIG. 4 to FIG. 9.

Figure 4:
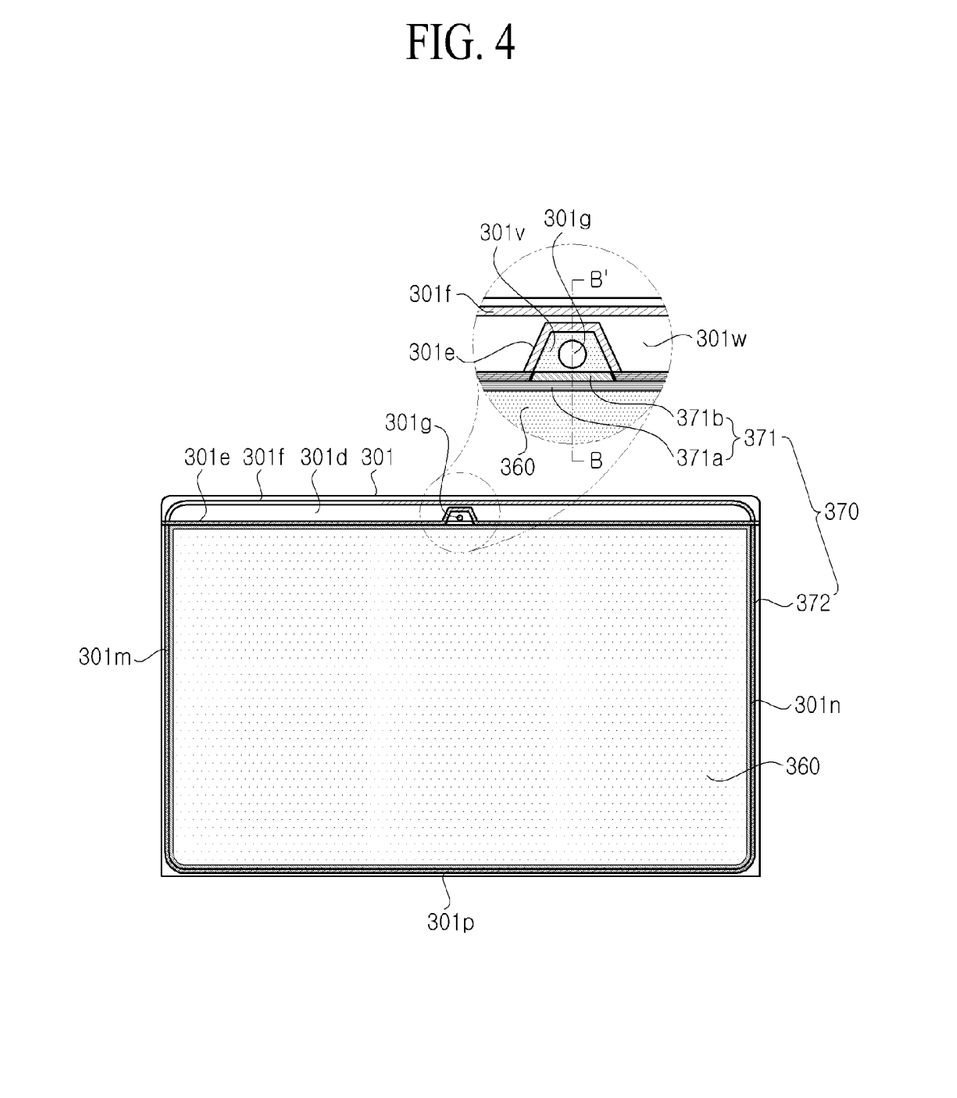
FIG. 4 is a plane view illustrating a liquid crystal panel according to an embodiment of the present invention.
Figure 5:
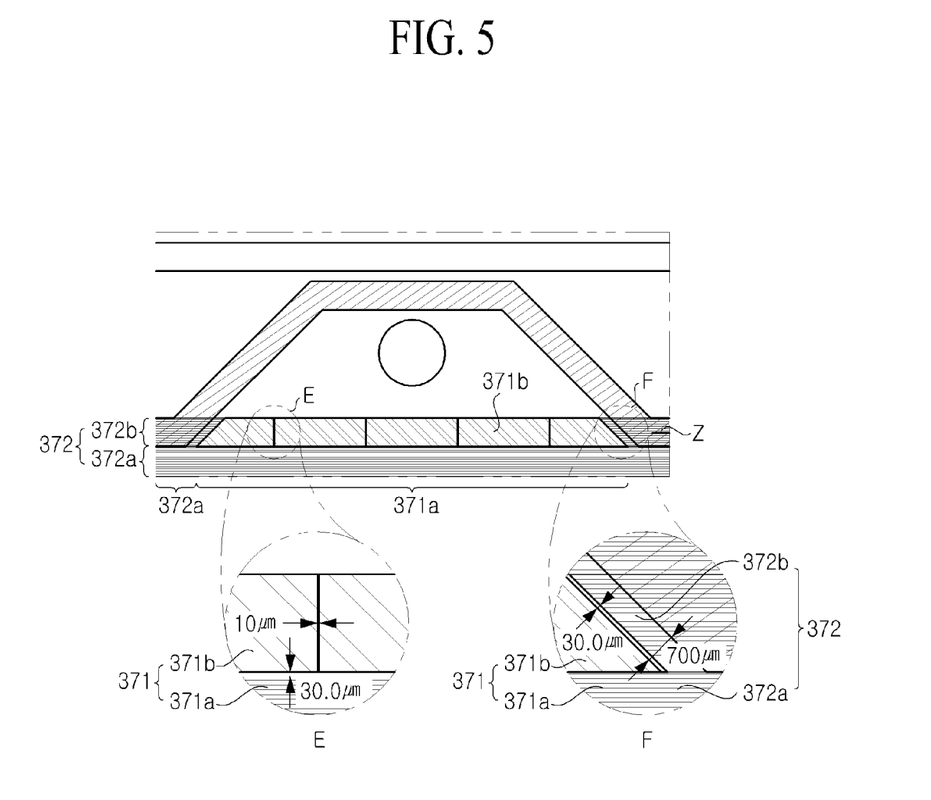
FIG. 5 is a detailed view illustrating a first common line and a second common line shown in FIG. 4.
Figure 6:
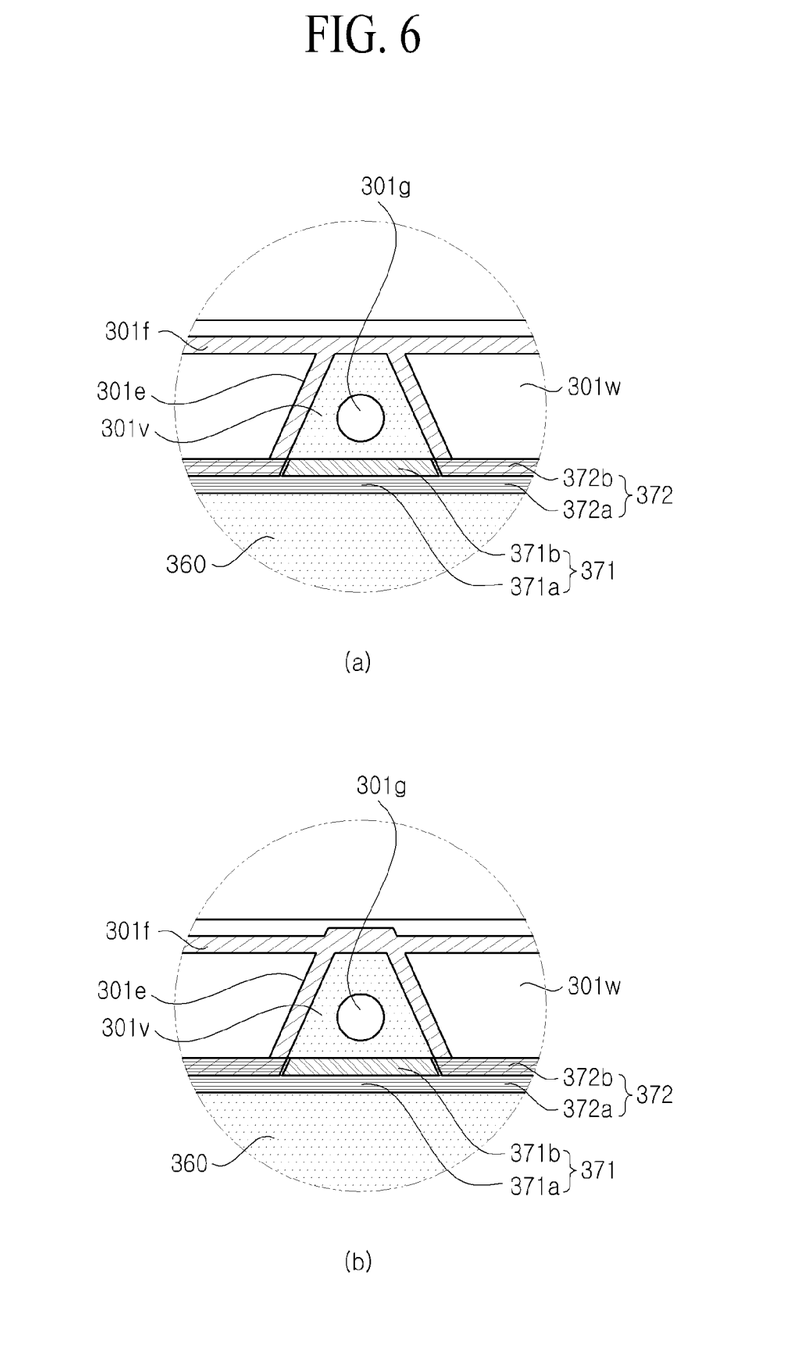
FIG. 6 is an exemplary view illustrating various examples of seals surrounding a light-transmitting portion applied to a liquid crystal panel according to an embodiment of the present invention.

FIG. 4 is a plane view illustrating a liquid crystal panel according to the present invention, especially a flat panel of the liquid crystal panel 301 shown in FIG. 3. FIG. 5 is a detailed view illustrating a first common line and a second common line shown in FIG. 4. FIG. 6 is an exemplary view illustrating various examples of seals surrounding a light-transmitting portion applied to a liquid crystal panel according to the present invention.

In the liquid crystal panel according to the present invention, the upper substrate 301a and the lower substrate 301b are bonded to each other and the liquid crystal is filled between the upper substrate 301a and the lower substrate 301b. The liquid crystal layer between the upper substrate and the lower substrate is sealed by seals formed outside the liquid crystal panel 301.

The liquid crystal panel 301 may be divided into a display area 360 where various elements are formed to display images, and a non-display area formed outside the display area, as described above. In this case, the seals may be divided into second to fifth seals 301f, 301m, 301n and 301p formed outside the liquid crystal panel in the non-display area of the liquid crystal panel in rectangular shapes, sealing the upper substrate and the lower substrate, and a first seal 301e formed between the first non-display area 301d and the display area 360.

The second to fifth seals 301f, 301m, 301n and 301p are formed at the outmost of four sides of the liquid crystal panel, that is, at the outmost of the entire liquid crystal panel, and the first seal 301e is formed on the border of the display area 360 and the first non-display area 301d of the liquid crystal panel.

The first non-display area 301d is provided with the through hole 301g from which a black matrix is removed, to allow the light from the outside to enter a lens of the camera.

The first seal 301e may be configured to surround the light-transmitting portion 301v as shown in the enlarged circle of FIG. 4. In other words, the light-transmitting portion 301v is disconnected from a portion 301w (hereinafter, simply referred to as 'side portion') except for the light-transmitting portion 301v of the first non-display area 301d, and is connected with the display area 360.

Accordingly, if the liquid crystal is filled into the liquid crystal layer between the upper substrate and the lower substrate which are sealed by the first seal 301e and the third to fifth seals 301m, 301n and 301p, the light-transmitting portion 301v is also filled with the liquid crystal. At this time, the side portion 301w is sealed by the first seal 301e and the second seal 301f in a vacuum state.

The reason why the light-transmitting portion 301v is filled with the liquid crystal as described above is to offset a diffraction pattern of a concentric circle type, which is caused by diffraction of light that has passed through the through hole 301g, by using scattering properties of the liquid crystal.

In other words, the concentric circle type diffraction pattern occurring on the image taken by the camera and spectrum Mura occurring on appearance of the liquid crystal panel are generated by diffraction of light that has passed through the through hole 301g. According to the present invention, this problem is solved using scattering of the liquid crystal in such a manner that the light-transmitting portion 301v between the through hole 301g and the camera lens is filled with the liquid crystal.

In particular, since the liquid crystal has a refractive index (n=1.54) similar to a refractive index (n=1.51) of a glass, which forms the upper substrate 301a and the lower substrate 301b, diffraction may be more reduced. For this reason, the diffraction pattern on the image and spectrum Mura on the entire surface of the liquid crystal panel may be more reduced.

The first seal 301e surrounding the light-transmitting portion 301v may be formed in various types in addition to the types shown in FIG. 4 and FIG. 5.

In other words, the light-transmitting portion 301v may be spaced apart from the second seal 301f and surrounded by the first seal 301e as shown in FIG. 4 and FIG. 5. The light-transmitting portion 301v may be surrounded by the first seal 301e and the second seal 301f as shown in part (a) of FIG. 6, and may be surrounded by the first seal 301e and the second seal 301f, which is overlapped with the first seal 301e, as shown in part (b) of FIG. 6.

A common line 370 is formed at a portion of the lower substrate 301b, which is overlapped with the first seal 301e and the third to fifth seals 301m, 301n and 301p. The common line 370 serves to apply a common voltage to a common electrode formed in the upper substrate 301a or the lower substrate 301b. Hereinafter, for convenience of description, the liquid crystal panel where the common electrode is formed in the upper substrate will be described as an example of the present invention. In other words, the common line 370 is connected with a common voltage generator (not shown), which generates a common voltage, and is connected with the common electrode through a contact hole, etc.

The common line 370 includes a first common line 371 formed between the light-transmitting portion 301v and the display area, and a second common line 372 formed outside the display area to overlap the seal.

The first common line 371 is formed between the light-transmitting portion 301v of the non-display area of a driving device array substrate, which includes the upper substrate, and the display area 360 of the driving device array substrate, wherein the light-transmitting portion is formed to correspond to the camera arranged below a driving device array substrate. The first common line 371 includes a mesh common line 371a formed of mesh lines and a plate common line 371b formed of a plate.

The second common line 372 is formed between the first non-display area 301d of the non-display area, which is provided with the light-transmitting portion 301v, and the display area 360, and is connected with the common electrode formed in a color filter substrate, which includes the lower substrate 301b, or the driving device array substrate, and is also connected with both ends of the first common line 371.

The second common line 372 is formed of a mesh (net) structure so that ultraviolet rays irradiated from the bottom of the lower substrate towards the seals 301e, 301m, 301n, and 301p formed on the second common line 372 may pass through the second common line 372.

Although the first seal 301e and the third to fifth seals 301m, 301n and 301p may overlap the second common line 372, only the first seal 301e may overlap with the second common line 372. Also, the first seal 301e and at least one of the third to fifth seals 301m, 301n and 301p may overlap with the second line 372. In other words, the second common line 372 may be formed to overlap with the first seal 301e, and may overlap with the other seals in various manners if necessary.

The second common line 372 has a width thicker than or equal to that of the seal overlapped therewith. For example, as shown in FIG. 5, the length extended from a center point z of the seal towards the display area 360 is longer than that of the second common line 372 extended from the center point z of the seal towards the display area 360. The length extended from the center point z of the seal towards the non-display area (especially, first non-display area) 301d is equal to that of the second common line 372 extended from the center point z of the seal towards the non-display area (especially, first non-display area) 301d.

The first common line 371 includes a mesh common line 371a of a mesh structure and a plate common line 371b of a plate structure. The mesh common line 371a is formed to adjoin the display area 360 between the light-transmitting portion 301v and the display area 360, and the plate common line 371b is formed to adjoin the light-transmitting portion 301v between the light-transmitting portion 301v and the display area 360.

The first common line 371 and the second common line 372, as described above, serve to apply the common voltage to the common electrode. The first common line 371 should electrically be connected with the second common line 372. To this end, the mesh common line 371a is electrically connected with the second common line 372.

In order to prevent noise generated from the plate common line 371b from being transmitted to the second common line 372 through the mesh common line 371a, the plate common line 371b may electrically be disconnected from the mesh common line 371a.

For example, the plate common line 371b may be spaced apart from the mesh common line 371a at an interval of 30.0 μm, approximately, as shown in an enlarged portion of E of FIG. 5.

Also, the plate common line 371b may be spaced apart from the second common line 372 at an interval of 30.0 μm, approximately, as shown in an enlarged portion of F of FIG. 5.

In this case, the spacing interval of 30.0 μm may be formed equally to that of the mesh lines that form the second common line 372.

The second common line 372 includes a first mesh line 372a connected with the mesh common line 371a and a second mesh line 372b spaced apart from the plate common line 371b in a state that it adjoins the plate common line 371b.

The second mesh line 372b, as shown in FIG. 5, is extended to the light-transmitting portion 301v where the seal is not formed, and is spaced apart from the plate common line 371b at the light-transmitting portion 301v. In this case, the length of the second mesh line 372b extended to the light-transmitting portion 301v where the seal is not formed may be 760 μm as shown in the enlarged portion of F of FIG. 5. Also, the spacing interval between the second mesh line 372b and the plate common line 371b may be 30.0 μm.

In order to prevent transmission of signals generated by short-circuit due to thermal expansion or generated abnormally, the plate common line 371b, as shown in an enlarged portion of E of FIG. 5, may be divided into at least two or more segments. In this case, the respective segments may be spaced apart from each other at an interval of 10.0 μm.

Meanwhile, the first seal 301e is formed on the second common line 372 to overlap the second common line 372, and does not overlap the first common line 371. The first seal 301e surrounds the light-transmitting portion 301v. The other seals except for the first seal 301e surround the outside of the display area 360. In this case, the second common line 372 may be formed to overlap the other seals except for the first seal 301e as described above.

Figure 7:
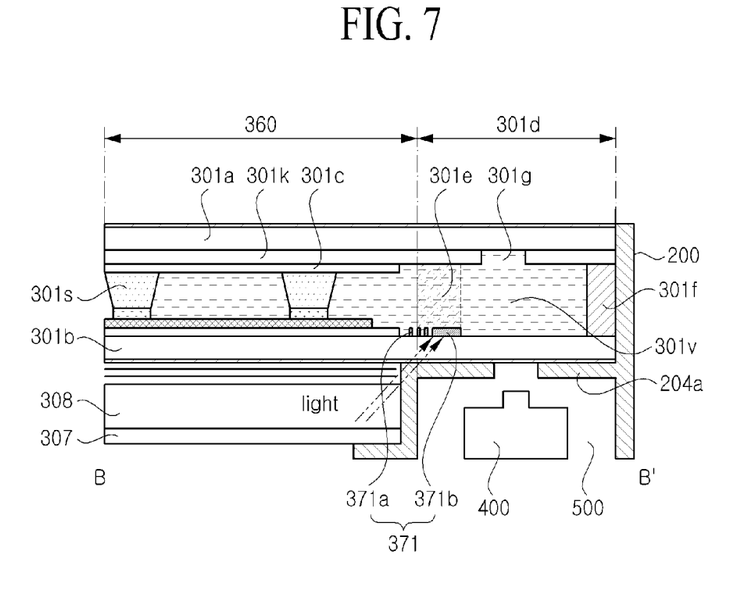
FIG. 7 is a detailed cross-sectional view illustrating a liquid crystal display device according to an embodiment of the present invention.

FIG. 7 is a detailed cross-sectional view illustrating a liquid crystal display device according to the present invention, and in more detail illustrates a portion D shown in FIG. 3 and the section taken along line B-B' of FIG. 4.

First of all, the liquid crystal panel 301 includes an upper substrate 301a, a lower substrate 301b, and a liquid crystal layer formed between the upper substrate 301a and the lower substrate 301b.

The lower substrate 301b is a base substrate forming the driving device array substrate. Although not shown in detail, the lower substrate 301b is provided with a plurality of pixels, each of which includes a driving device such as a thin film transistor.

The upper substrate 301a is a base substrate forming the color filter substrate, and is provided with a color filter layer for displaying color.

Also, a pixel electrode is formed in the lower substrate 301b, and a common electrode may be formed in the lower substrate or the upper substrate. An alignment layer for aligning liquid crystal molecules of the liquid crystal layer is deposited on the lower substrate and the upper substrate. Hereinafter, for convenience of description, the liquid crystal display device in which the common electrode is formed in the upper substrate 301a will be described as an example of the present invention.

The lower substrate 301b and the upper substrate 301a are bonded to each other by the second seal 301f and the third to fifth seals 301m, 301n and 301p, which are formed outside the substrates. A given cell gap is maintained by a spacer 301s formed between the lower substrate 301b and the upper substrate 301a.

The liquid crystal panel 301 configured as above drives the liquid crystal through a driving device formed in the lower substrate 301b, and displays information by controlling the amount of light that transmits the liquid crystal layer.

In the liquid crystal panel 301 configured as above, the lower substrate 301b is formed by a driving device array substrate process that forms the driving device, and the upper substrate 301a is formed by a color filter substrate process that forms a color filter.

The driving device array substrate process includes forming a plurality of gate lines and data lines, which define pixel areas, on the lower substrate, forming a thin film transistor which is a driving device connected with the gate lines and the data lines, in each of the pixel areas, and forming a pixel electrode which is connected to the thin film transistor and drives the liquid crystal layer as a signal is applied through the thin film transistor.

The color filter substrate process includes forming a black matrix 301k on the upper substrate 301a, forming a color filter on the black matrix 301k, and then forming a common electrode 301c.

The black matrix 301k is deposited on the upper substrate 301a of the liquid crystal panel applied to the liquid crystal display device according to the present invention, as described above. This black matrix 301k is also formed in the first non-display area of the liquid crystal panel, and the through hole 301g is formed in the black matrix 301k to correspond to the camera. The through hole 301g may be formed by an etching process of the color filter substrate process.

In other words, after the black matrix 301k, the color filter (not shown), and the common electrode 301c are deposited on the upper substrate 301a, the through hole 301g is formed by an etching process using a mask. At this time, the through hole 301g may be formed as the black matrix is etched together with the color filter or the common electrode.

Also, a spacer for uniformly maintaining a cell cap between the upper substrate and the lower substrate is formed in the common electrode 301c or planarization layer of the upper substrate 301a. Preferably, a column spacer 301s is used as the spacer. This column spacer 301s may be formed at a desired position with the same density over the entire liquid crystal panel. In other words, as the column spacer is formed at a desired position, the cell gap between the upper substrate 301a and the lower substrate 301b is maintained uniformly, whereby an opening ratio may be prevented from deteriorating.

Also, a projection corresponding to the column spacer 301s may be formed in the lower substrate 301b. This projection serves to prevent a press defect from being generated when the column spacer 301s is in contact with the lower substrate 301b.

As described above, the column spacer 301s deposited on the upper substrate 301a may directly be in contact with the lower substrate 301b to maintain the cell gap, or may be in contact with the projection to maintain the cell gap.

In other words, the liquid crystal panel 301 is formed by bonding between the upper substrate 301a where the column spacer 301s is formed, and the lower substrate 301b.

In the last process for manufacturing the liquid crystal panel 301, the edge of the liquid crystal panel is sealed by the seal 301f. In this sealed state, after the liquid crystal is injected into the liquid crystal layer through a seal injection hole, the seal injection hole is finally sealed, whereby the liquid crystal panel is completed.

As another method, after the seals are dropped into a plurality of areas of the lower substrate 301b, the upper substrate 301a where the seals are formed may be bonded to the lower substrate 301b, whereby the seals may uniformly be distributed between the lower substrate 301b and the upper substrate 301a.

At this time, the present invention is characterized in that the liquid crystal is formed to reach the light-transmitting portion 301v of the first non-display area 301d, as shown in FIG. 4.

In other words, according to the present invention, the liquid crystal may be injected into the light-transmitting portion 301v of the first non-display area 301d, whereby the light-transmitting portion formed in the first non-display area 301d may be prevented from being recessed.

Also, the refractive index of the liquid crystal is closer to that of the glass than the air or vacuum. Accordingly, if the liquid crystal is injected into the liquid crystal layer of the first non-display area 301d, diffraction of the light-transmitting portion 301v may be prevented. For this reason, the diffraction pattern on the image taken by the camera may be prevented.

The common line 370 is formed between the first non-display area 301d of the lower substrate 301b and the display area to overlap the seal. The common line 370 serves to apply the common voltage to the common electrode formed in the upper substrate 301a or the lower substrate 301b.

The common line 370 includes the first common line 371 formed between the light-transmitting portion 301v and the display area 360, and the second common line 372 except for the first common line.

The first common line 371 includes the mesh common line 371a formed of mesh lines and the plate common line 371b formed of a plate.

The respective mesh lines that form the mesh common line 371a are spaced apart from each other at a uniform interval as described above, and the mesh common line 371a and the plate common line 371b are also spaced apart from each other at a uniform interval.

Since the details of the first common line 371 and the second common line 372 have been described with reference to FIG. 4 and FIG. 5, their detailed description will be omitted.

Since the first seal 301e formed between the first non-display area 301d and the display area 360 is not formed in the section B-B', it is marked with a dotted line in FIG. 7. In other words, the first seal 301e is formed between the first non-display area 301d and the display area 360 to overlap the second common line 372 formed on the extension line of the first common line 371.

Figure 8:
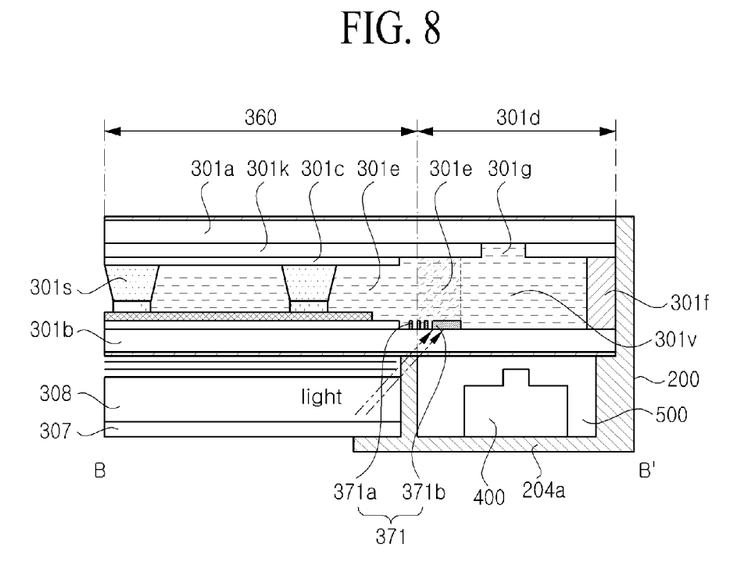
FIG. 8 is another detailed cross-sectional view illustrating a liquid crystal display device according to an embodiment of the present invention.

FIG. 8 is another detailed cross-sectional view illustrating a liquid crystal display device according to the present invention, and in more detail illustrates a portion D shown in FIG. 4 and the section taken along line B-B' of FIG. 4. The liquid crystal display device according to the present invention as shown in FIG. 8 has the same structure as that shown in FIG. 7 and performs the same function as that shown in FIG. 7 except that a structure of a guide frame 200 provided with a camera receiving portion 500 is different from that of the guide frame 200 applied to the liquid crystal display device shown in FIG. 7.

In the guide frame 200 applied to the present invention, a panel support portion 204a that supports the first non-display area 301d may be formed in a shape of an upside down "U" shape as shown in FIG. 7 or in a "U" shape as shown in FIG. 8.

Particularly, the present invention shown in FIG. 8 is to prevent Ripple phenomenon at the liquid crystal panel from being generated due to contact with the panel support portion 204a.

In other words, according to the present invention shown in FIG. 8, since the panel support portion 204a is formed in a shape of a "U" shape, the light-transmitting portion 301v is not in contact with the panel support portion 204a. For this reason, interference between the first non-display area and the panel support portion 204a does not occur. Accordingly, Ripple phenomenon does not occur.

Hereinafter, a method for manufacturing a liquid crystal display device according to the present invention will be described with reference to FIG. 9.

Figure 9:
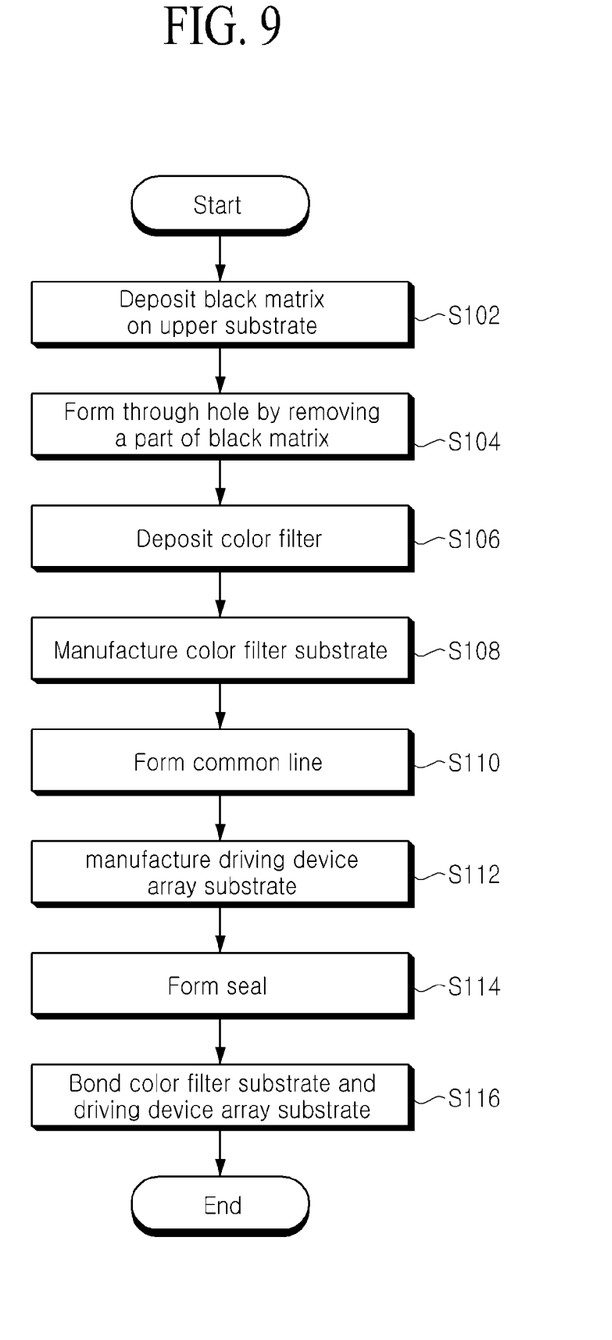
FIG. 9 is a flow chart illustrating a method for manufacturing a liquid crystal display device according to an embodiment of the present invention.

FIG. 9 is a flow chart illustrating a method for manufacturing a liquid crystal display device according to the present invention.

First of all, in order to manufacture the liquid crystal display device according to the present invention, the black matrix (BM) 301k is deposited on the upper substrate 301a (S102).

Next, from the black matrix 301k deposited on the first non-display area 301d of the upper substrate 301a, a portion of the black matrix, which corresponds to the camera lens, is removed, whereby the through hole 301g is formed (S104).

Then, R, G, B color filters and a transparent electrode for forming the common electrode are sequentially deposited on the display area of the upper substrate 301a (S106). Although the common electrode may be deposited on the display area, it may be deposited on the non-display area, in the same manner as the color filters. Particularly, if the transparent electrode is deposited on the first non-display area 301d, a process for removing the common electrode deposited on the portion of the through hole 301g may be provided additionally. However, if the common electrode is formed of a material having a refractive index similar to that of glass, the common electrode deposited on the portion of the through hole 301g may not be removed. Also, an overcoating (OC) layer may be deposited on the display area 360 of the upper substrate 301a. The overcoating layer may be formed of an organic material, an inorganic material, or an organic and inorganic material. Generally, materials used as the overcoating layer have a refractive index similar to that of glass. Accordingly, even though the overcoating layer is deposited on the through hole of the upper substrate, an additional process for removing the overcoating layer is not required.

Next, the color filter substrate is finally manufactured by the aforementioned steps (S108).

Afterwards, the driving device and the common line 370 are formed in the lower substrate 301b (S110). In other words, the driving device array substrate is manufactured in such a manner that a gate electrode is formed on the lower substrate 301b, and a gate insulating film, a data line and a pixel electrode are sequentially deposited on the gate electrode. The color filter substrate and the driving device array substrate may be manufactured by their respective processes different from each other at the same time.

In this case, in the lower substrate 301b, the common line 370 is formed outside the display area 360 by using the same metal material as that of the gate electrode or gate line.

The common line 370, as described above, includes the first common line 371 and the second common line 372. The first common line 371 includes the mesh common line 371a and the plate common line 371b, and the second common line 372 is formed of a plurality of mesh lines.

Next, an alignment layer is formed on the lower substrate 301b where the driving device and the common line are formed as above, whereby the driving device array substrate 301b is manufactured (S112).

Afterwards, the seal is formed in the upper substrate or the lower substrate to surround the outside of the display area 360 (S114). The seal may be formed in various types as described above. Particularly, the first seal 301e formed between the first non-display area 301d and the display area 360 is formed to surround the light-transmitting portion 301v formed in the first non-display area 301d.

Accordingly, the first seal 301e is not formed between the light-transmitting portion 301v and the display area 360, and the first common line 371 is only formed therebetween.

Finally, the color filter substrate, which includes the upper substrate, and the driving device array substrate, which includes the lower substrate, are bonded to each other using the seal (S116). As described above, after the color filter substrate and driving device array substrate are bonded to each other, the liquid crystal is injected between the color filter substrate and the driving device array substrate, whereby the liquid crystal may be formed in the display area 360. Also, after the liquid crystal is injected onto the driving device array substrate in a drop type, it may be formed in the display area 360 by bonding between the driving device array substrate and the color filter substrate.

Particularly, the liquid crystal is also injected into the light-transmitting portion 301v formed in the first non-display area 301d, as well as the display area 360. In other words, since the seal is not formed between the light-transmitting portion 301v and the display area 360, the liquid crystal injected into the display area 360 may also be injected into the light-transmitting portion 301v.

As described above, the liquid crystal panel and the liquid crystal display device using the same according to the present invention have the following advantages.

Among the common lines formed to overlap the seal formed between the non-display area and the display area, since the common line formed between the light-transmitting portion where the through hole is formed and the display area is formed in a plate structure, light leakage may be prevented from occurring between the light-transmitting portion and the display area.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal panel comprising:
a first common line formed between a light-transmitting portion of a non-display area of a driving device array substrate and a display area of the driving device array substrate, the light-transmitting portion being formed to correspond to a camera arranged below the driving device array substrate, the first common line including a mesh common line formed of mesh lines and a plate common line formed of a plate;
a second common line formed between a first non-display area of the non-display area and the display area, connected with a common electrode formed in a color filter substrate or the driving device array substrate and connected to both ends of the first common line, the first non-display area being provided with the light-transmitting portion;
a seal formed on the second common line to overlap the second common line without overlapping the first common line, surrounding the light-transmitting portion and the outside of the display area; and
liquid crystal injected into the display area and the light-transmitting portion, which are surrounded by the seal, wherein the driving device array substrate and the color filter substrate are bonded to each other by the seal.

2. The liquid crystal panel of claim 1, wherein the second common line has a width thicker than or equal to that of the seal overlapped with the second common line.

3. The liquid crystal panel of claim 1, wherein a length extended from a center point of the seal overlapped with the second common line towards the display area is longer than a length of the second common line extended from the center point towards the display area, and a length extended from the center point of the seal towards the non-display area is equal to a length of the second common line extended from the center point towards the non-display area.

4. The liquid crystal panel of claim 1, wherein the mesh common line is formed between the light-transmitting portion and the display area to adjoin the display area, and the plate common line is formed between the light-transmitting portion and the display area to adjoin the light-transmitting portion.

5. The liquid crystal panel of claim 1, wherein the mesh common line is electrically connected with the second common line, and the plate common line is electrically disconnected from the mesh common line.

6. The liquid crystal panel of claim 5, wherein the plate common line is electrically disconnected from the second common line.

7. The liquid crystal panel of claim 6, wherein the second common line includes a first mesh line connected with the mesh common line, and a second mesh line disconnected from the plate common line while adjoining the plate common line.

8. The liquid crystal panel of claim 7, wherein the second mesh line is extended to the light-transmitting portion where the seal is not formed, and is disconnected from the plate common line in the light-transmitting portion.

9. The liquid crystal panel of claim 1, wherein the plate common line is divided into at least two segments.

10. A liquid crystal display device comprising:
a display unit that includes the liquid crystal panel according to claim 1; and
a guide frame for supporting the display unit,
wherein the guide frame includes a guide sidewall for guiding the side of the liquid crystal panel and a liquid crystal panel support portion for supporting the liquid crystal panel, a first part of the liquid crystal panel support portion includes a camera receiving portion to which a camera is fixed, and a black matrix fixed to the first part of the liquid crystal panel and formed in the light-transmitting portion of the first non-display area is provided with a through hole to allow light to be transmitted towards the camera.

* * * * *